(12) United States Patent
Nagpal et al.

(10) Patent No.: US 10,247,564 B1
(45) Date of Patent: *Apr. 2, 2019

(54) METHOD AND SYSTEM FOR CROWD-SOURCED NAVIGATION PROFILE OPTIONS

(71) Applicant: MAPSTED CORP., Mississauga (CA)

(72) Inventors: Paramvir Singh Nagpal, Brampton (CA); Kathleen M. Chapman, Bowmanville (CA); Saeedeh Hamidifar, Mississauga (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,624

(22) Filed: Sep. 29, 2018

Related U.S. Application Data

(63) Continuation of application No. 15/869,900, filed on Jan. 12, 2018, now Pat. No. 10,145,701.

(51) Int. Cl.
*G01C 21/26* (2006.01)
*G01C 21/34* (2006.01)
*G01C 21/36* (2006.01)

(52) U.S. Cl.
CPC ......... *G01C 21/3484* (2013.01); *G01C 21/26* (2013.01); *G01C 21/3476* (2013.01); *G01C 21/3614* (2013.01); *G01C 21/3626* (2013.01); *G01C 21/3676* (2013.01); *G01C 21/3682* (2013.01)

(58) Field of Classification Search
CPC ............ G01C 21/3484; G01C 21/3626; G01C 21/3682; G01C 21/3614; G01C 21/3676; G01C 21/3476; G01C 21/26
See application file for complete search history.

(56) References Cited

U.S. PATENT DOCUMENTS

| | | | |
|---|---|---|---|
| 8,473,241 B2* | 6/2013 | Foxlin | G01C 21/165 |
| | | | 702/150 |
| 8,538,688 B2* | 9/2013 | Prehofer | G01C 21/3484 |
| | | | 340/995.14 |
| 9,116,011 B2* | 8/2015 | Lynch | G01C 21/3638 |
| 9,157,745 B2* | 10/2015 | Das | G01C 21/20 |
| 9,423,263 B2* | 8/2016 | Tuukkanen | G01C 21/26 |

(Continued)

*Primary Examiner* — Russell Frejd
(74) *Attorney, Agent, or Firm* — Henry L. Ohab

(57) ABSTRACT

A method and a system for recommending a pedestrian route based on crowd-sourced pedestrian navigation associated with an indoor area. The method comprises displaying a set of graphical icons representing a respective route traversal profile option, the set rendered within a graphical user interface (GUI) of a mobile device, the GUI depicting a layout of the indoor area, receiving a selection of a graphical icon from the set, storing route activity data in association with the selected graphical icon during traversal, by the mobile device, of a route within the layout, adding the route activity data to accumulated route navigation data associated with the selected graphical icon, and based on a predetermined threshold associated with the adding, deploying the respective route traversal profile option represented by the selected graphical icon, the profile option recommending the pedestrian route based at least in part on the route activity data.

20 Claims, 3 Drawing Sheets

(56) References Cited

U.S. PATENT DOCUMENTS

| | | | |
|---|---|---|---|
| 2009/0043504 A1* | 2/2009 | Bandyopadhyay | G01C 17/38 701/469 |
| 2013/0101159 A1* | 4/2013 | Chao | G06K 9/00771 382/103 |
| 2014/0018095 A1* | 1/2014 | Parvizi | H04W 4/025 455/456.1 |
| 2015/0260539 A1* | 9/2015 | Lynch | G01C 21/3638 701/400 |
| 2015/0348117 A1* | 12/2015 | Busch | H04W 4/029 705/14.44 |
| 2017/0219359 A1* | 8/2017 | Elhoushi | G01C 21/206 |

* cited by examiner

METHOD AND SYSTEM FOR CROWD-SOURCED NAVIGATION PROFILE OPTIONS

CROSS-REFERENCE TO RELATED APPLICATION

This application claims the benefit of priority to U.S. application Ser. No. 15/869,900 filed 12 Jan. 2018, now issued as U.S. Pat. No. 10,145,701B2, and hereby incorporates said U.S. application Ser. No. 15/869,900 in the entirety herein.

BACKGROUND

Users of mobile devices are increasingly using and depending upon indoor positioning and navigation applications and features. Seamless, accurate and dependable indoor positioning can be difficult to achieve using satellite-based navigation systems when the latter becomes unavailable or sporadically available, such as within enclosed or partly enclosed urban infrastructure and buildings, including hospitals, shopping malls, airports, college buildings, sports arenas and industrial warehouses. Solutions that assist a pedestrian user in planning or navigating a route enhance the utility, and ready adoption, of indoor positioning systems.

DETAILED DESCRIPTION

Figure 1:
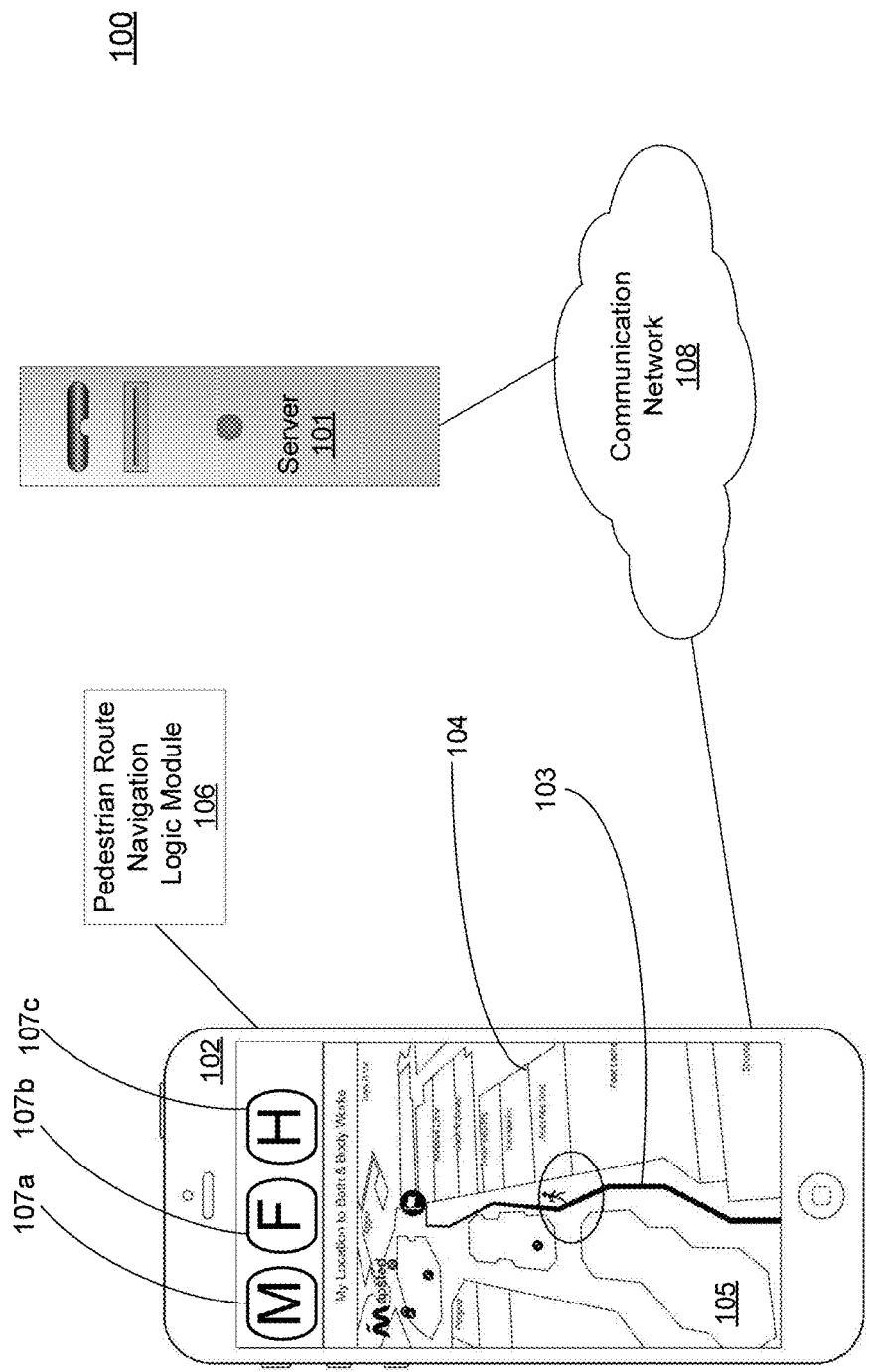
FIG. 1 illustrates, in an example embodiment, a system for recommending a pedestrian route based on crowd-sourced pedestrian navigation.

Among other benefits and technical effects, embodiments provided herein alleviate a bottleneck imposed by having individual mobile device users individually and separately plan or learn indoor pedestrian routes for navigation as prerequisite to deployment and use of indoor navigation and positioning solutions, and enable more rapid deployment, and scalability, of an indoor navigation solution by utilizing a crowd-sourcing based approach. An optional command mode invokes a recommended route for a pedestrian user of a mobile device to follow in a fingerprint-mapped indoor area, based on a navigation user profile indicated at a user interface of the mobile device.

More specifically, in the crowd sourcing-based approach, users may be provided an indoor positioning mobile device application, and may be encouraged to walk around or traverse areas of interest, for example an indoor shopping mall, a warehouse, or airport facility. Other than selecting a presented pedestrian navigation profile option presented, a user of mobile device 102 may, in effect, passively assist in creating route activity data in accordance with pedestrian route navigation profile options. The user trajectory may be determined, and corresponding to a sequence of locations along the trajectory, fingerprint measurements may be correlated in time and position with respective wireless communication signal signatures and mobile device sensor readings along the route that a user's mobile device traverses while within the area. As more trajectories from numerous other users' mobile devices are accumulated and logged, the group of accumulated user results, organized according to profile options selected by respective users, may be used to accumulate a fingerprint map associated with route activity data for the area.

In particular, the crowd sourcing based embodiments described here advantageously avoid the need for tedious and expensive individual mapping of various route-types that different types of users may prefer to traverse during the pedestrian navigation. Users incentives, for example, may be offered, to encourage random mobile device users to participate using their mobile device indoor navigation application, to build route types according to different, selectable user profile types or options.

A method of recommending a pedestrian route based on crowd-sourced pedestrian navigation associated with an indoor area, is provided. The method comprises displaying a set of graphical icons representing a respective route traversal profile option, the set rendered within a graphical user interface (GUI) of a mobile device, the GUI depicting a layout of the indoor area, receiving a selection of a graphical icon from the set, storing route activity data in association with the selected graphical icon during traversal, by the mobile device, of a route within the layout, adding the route activity data to accumulated route navigation data associated with the selected graphical icon, and based on a predetermined threshold associated with the adding, deploying the respective route traversal profile option represented by the selected graphical icon, the profile option recommending the pedestrian route based at least in part on the route activity data.

Also provided is a computing system, which in an embodiment may be a server computing system, for recommending a pedestrian route based on crowd-sourced pedestrian navigation associated with an indoor area. The computing system includes a processor, a memory storing a set of instructions, the instructions being executable in the processor to: upon receiving a selection of a graphical icon among a set of graphical icons displayed at a graphical user interface (GUI) of a mobile device, ones of the set representing a respective route traversal profile option, the GUI depicting a layout of the indoor area, storing route activity data in association with the selected graphical icon during traversal, by the mobile device, of a route within the layout, adding the route activity data to accumulated route navigation data associated with the selected graphical icon, and based on a predetermined threshold associated with the adding, deploying the respective route traversal profile option represented by the selected graphical icon, the profile option recommending the pedestrian route based at least in part on the route activity data.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components.

Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, wearable devices, tablet devices and laptop computing devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, a system for recommending a pedestrian route based on crowd-sourced pedestrian navigation associated with an indoor area. Mobile device 102 includes pedestrian route navigation logic module 106, and is communicatively connected via communication network 108 to a server computing device 101. Pedestrian route navigation logic module 106, in one embodiment, may be included in an indoor positioning or indoor navigation software application downloaded and installed at mobile device 102. The indoor navigation software application downloaded and installed, or stored, in a memory of mobile device 102 may render physical layout map 105 of a facility or building within a graphical user interface (GUI) display of mobile device 102. In one embodiment, the navigation software application may incorporate one or more portions of processor-executable instructions manifesting pedestrian route navigation logic module 105. The term pedestrian as used herein is intended not encompass not only walking pedestrians, but also users moving at typical pedestrian speeds, for example at less than 10 miles per hour, using automated means such as automated wheelchairs or automated people-moving indoor carts. The terms indoor facility or building as used herein means an at least partially enclosed building having at least one fixed boundary, such as an exterior boundary wall.

Display of physical layout map 105 may further show trajectory or route 103 traversed by mobile device 102, which may include a recommended or anticipated for traversal by a user carrying mobile device 102. Physical layout map 105 may further depict one or more layout physical constraint features 104, such as an internal wall or other map constraint feature including a doorway, a facility exit, a physical marker fixed in place, a facility entrance, a stairwell, a stairway, a corridor, an elevator, and an external boundary outline of the indoor facility. In some embodiments, layout constraint features 104 may constitute partitions between separate local venues, such as commercial stores, depicted in physical layout map 105 of the indoor building or area. In one embodiment, the indoor area includes multiple floors, and the recommended pedestrian route may include a route portion for transitioning, whether by stairs or automated means including an elevator or escalator, from one floor to another of the multiple floors.

In one embodiment, selectable navigation profile options may be presented at a GUI of mobile device 102. A user may optionally select a profile option which matches their profile, for example in accordance with the "M", "F" and "H" selectable graphical icons representing "male", "female" and "handicapped" navigation profile options 107a, 107b, 107c respectively, prior to traversing a trajectory or route within the indoor area. It is contemplated that other such profile options may be provided, such as for teenagers, children, athletes, or other designated groups based on user interests. In alternate embodiments, the graphical icons depicting selectable profile options within the GUI of mobile device 102 may not be limited to simply letters, for instance "F", "M" and "H" as depicted in FIG. 1, but rather may consist of more fanciful artwork, shapes or images, and even customizable artwork or images, while still maintaining the integrity of the particular navigation profile options made available for selection thereon.

Figure 2:
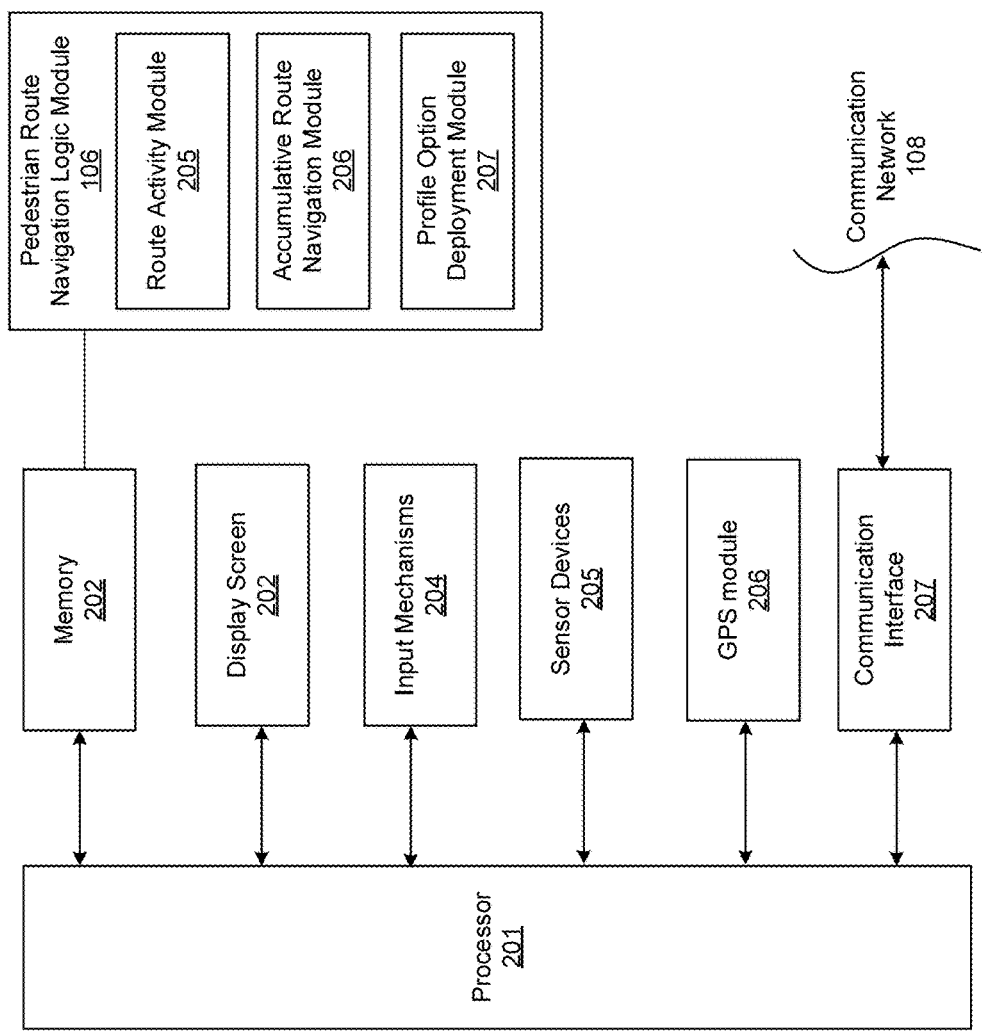
FIG. 2 illustrates an example architecture of a computing and communication mobile device for use with a crowd-sourced pedestrian navigation system.

FIG. 2 illustrates an example architecture of computing and communication mobile device 102 for use with crowd-sourced pedestrian navigation system 100. In one embodiment, mobile device 102 may correspond to, for example, a cellular communication device (e.g., smartphone, tablet, etc.) that is capable of telephony, messaging, and/or data computing services. In variations, mobile device 102 can correspond to, for example, a tablet or a wearable computing device. Mobile device 102 may include processor 201, memory 202, display screen 203, input mechanisms 204 such as a keyboard or software-implemented touchscreen input functionality, barcode, QR code or other symbol- or code-scanner input functionality. Mobile device 102 may include sensor functionality by way of sensor devices 205. Sensor devices 205 may include any of inertial sensors (accelerometer, gyroscope), magnetometer or other magnetic field sensing functionality, and barometric or other environmental pressure sensing functionality. Mobile device 102 may also include capability for detecting and communicatively accessing wireless communication signals, including but not limited to any of Bluetooth, Wi-Fi, RFID, and GPS signals. Mobile device 102 further includes the capability for detecting and measuring a received signal strength of the wireless communication signals. In particular, mobile device 102 may include location determination capability such as by way of GPS module 206, and communication interface 207 for communicatively coupling to communication network 108, such as by sending and receiving cellular data over data channels and voice channels.

Pedestrian route navigation logic module 106 of mobile device 102 may include processor-executable instructions stored in RAM, in one embodiment, in memory 202, and include as sub-modules, route activity module 205, accumulative route navigation module 206, and profile option deployment module 207.

Processor 201 uses executable instructions stored in route activity module 205 to acquire fingerprint data within the area by any one or more mobile devices 102. Fingerprint data may be used to track a mobile device 102 traversal along trajectory or route 103 within, and even adjoining, the indoor facility or area, by localizing mobile to particular positions according to the fingerprint data. The area may be an indoor area within a shopping mall, an airport, a warehouse, a sports arena, a university campus, or any at least partially enclosed building. In embodiments, the fingerprint data, as acquired from mobile device 102, further includes respective time-stamps, whereby the orientation, the magnetic field strength and direction, the received wireless signal strength, the barometric pressure, and the position data can be time-correlated for any given position along a trajectory or trajectory segment of the mobile devices, in accordance with the respective time-stamps. In embodiments, the fingerprint map data, which may be hosted in server 101 and made communicatively accessible to mobile device 102 via communication network 108, in one embodiment, further associates particular positions along route 103 with any combination of fingerprint data, including gyroscope data, accelerometer data, wireless signal strength data, wireless connectivity data, barometric data, acoustic data, line-of sight data, and ambient lighting data, in addition to magnetic data stored thereon.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint may include a correlation of sensor and signal information (including, but not necessarily limited to wireless signal strength, magnetic or barometric information, inertial sensor information) associated for a unique location relative to the facility. Thus, fingerprint data associated with a particular location or position may provide a fingerprint signature that uniquely correlates to that particular location or position, and allow for localizing the mobile device at a particular position or location along a trajectory of motion across the indoor area.

In a variation, route activity data of mobile device 102 currently traversing a route within the indoor area may be added to the fingerprint data of the database, hosted at server 101 in an embodiment as the traversal progresses, to continuously and cumulatively build the route activity and fingerprint data records of accumulated pedestrian navigation route data. The route activity data added to the fingerprint database may include dwell time data recorded during a mobile device route traversal, where the dwell time encompasses time spent at given positions or locations along the trajectory of the mobile device in the indoor area. Thus, route activity data of mobile device 102 currently traversing a route within the indoor area may be added to the historical fingerprint data of the database as the traversal progresses, to continuously and cumulatively build the route activity and fingerprint data records of accumulated pedestrian navigation route data for association with accumulative route navigation module 206.

Processor 201 uses executable instructions stored in accumulative route navigation module 206 to add the route activity data of mobile device 102 to accumulated route navigation data associated with the graphical icon representing a navigation profile option as selected by a user at mobile device 102. The accumulated route navigation data may comprise prior route activity data pertaining to respective mobile devices that have historical, or prior traversals, of the indoor area. In one embodiment, the accumulated route navigation data may be stored at a database that is communicatively accessible over communication network 108 to mobile device 102 and server computing device 101.

In yet another embodiment, the route activity data pertaining to mobile device 102 may be temporarily quarantined, or only conditionally added, pending occurrence or performance of some confirming event, before being permanently added to the accumulated route navigation data for use in conjunction with accumulative route navigation module 206. Conditionally updating the accumulated route navigation data in the latter manner allows the system to automatically detect, and allow for correction, of inconsistencies prior to deploying the pedestrian navigation profile options for use. Such a confirming event may be such as a dwell time in a confirmed or landmarked location that could reasonably or confidently be associated with the profile option as selected by a user of mobile device 102. For instance, a significantly high or higher dwell time at a women's store, or at a women's washroom facility within the indoor area, would tend to confirm a "F" female profile option where such was selected by a user at the display interface of mobile device 102 prior to traversing the indoor area. Similarly, a route traversed by mobile device 102 within the indoor area that eschews or avoids physical stairs where existing, in favor of a ramp or an elevator, would weigh in favor of, or tend to confirm, an inference of a physical handicap route or user, where the user might have selected the "H" option as described in the examples herein, prior to traversing the indoor area.

Accumulative route navigation module 206 may include, or be enabled with access to, a database, such as a positioning fingerprint database hosted at remote server 101, that stores accumulated trajectory information of mobile devices which have previously or historically traversed the given indoor area. The trajectory information may include route activity data, such as the specific sequence of positions constituting a route taken by the respective mobile devices, in conjunction with dwell times of the respective mobile devices at positions along the sequence of positions constituting the mobile device trajectory, or route traversed, within the indoor area.

In an embodiment, the historical mobile devices trajectory information stored in accumulative route navigation module 206 may be organized such that the trajectory information of a given mobile device as stored therein is associated with a particular navigation profile option, for example in accordance with the "M", "F" and "H" selectable navigation profile options 107a, 107b, 107c depicted in FIG. 1 as might be selected by a user of that mobile device prior to traversing a trajectory or route within the indoor area.

The fingerprint information stored in the database associated with accumulative route navigation module 206 may include data mapped at least in part using sensor devices 205 during traversal of the indoor area by mobile devices, the sensor devices 205 including but not limited to an accelerometer, a gyroscope, a magnetometer, a barometer, and a wireless signal strength sensor. The fingerprint data may include any one of orientation data, a magnetic field data including strength and direction, received wireless signal strength data, barometric pressure data, and also GPS location data at a given position within the area for respective mobile devices. The fingerprint data may be time-stamped for correlating with positions traversed along a given indoor area. In recording the time-stamped magnetic field information and wireless radio signals, and may be matched, or localized, to positions along a mobile device trajectory in a physical map of the indoor area.

In an embodiment, the fingerprint data and route activity data as stored may be further associated with dwell time data for a mobile device route traversal, where the dwell time encompasses time spent at given positions or locations along a trajectory of the mobile device in the indoor area. In yet another variation, the dwell time data may be correlated with the time-stamped and position-correlated fingerprint data. Thus, route activity data of mobile device 102 currently traversing a route within the indoor area may be added to the historical fingerprint data of the database as the traversal progresses, to continuously and cumulatively build the route activity and fingerprint data records of accumulated pedestrian navigation route data for association with accumulative route navigation module 206.

The terms position or location as used herein refers to a coordinate location, and may be expressed in local or global (X, Y) coordinate terms. In some embodiments, the coordinates may further include a Z coordinate representing a height, for example associated with a given floor within a multi-floor building, and thus expressed in (X, Y, Z) coordinate terms.

Processor 201 uses executable instructions stored in profile option deployment module 207 to deploy, based on applying a predetermined threshold associated with addition of the route activity data to the accumulative route navigation data, the respective route traversal profile option represented by the selected one of graphical icons 107a-c presented at mobile device 102.

The predetermined threshold may be applied, as route activity data of mobile devices are cumulatively added to the historical accumulated route navigation data, to determine when a sufficient amount of mobile devices' data, or sufficiently valid mobile devices' data, has been accumulated as prerequisite to launching or deploying the pedestrian route navigation profile options for further use, such as via a second command mode for traversing the indoor area. In an embodiment, the predetermined threshold may be established using a requisite total number of data-contributing mobile devices (that is, a total number of the historical plurality of mobile devices and mobile device 102), based on a statistically significant confidence level in view of that total number. In this manner, applying the predetermined threshold facilitates validating the accumulated route navigation data as sufficient for deploying based on a most recent addition of mobile device 102 route activity data to the accumulated navigation route data for the indoor area.

In one embodiment, a successive or rapidly-repeated selection of, such as via a double-tap upon, a respective one of the graphical icons 107a-c may initiate a recommendation, at the touchscreen GUI of mobile device 102, for traversing the indoor area, based on activity route data that is associated with the respective navigation profile option represented by that selected graphical icon 107a-c. In one example, a double-tap may be performed upon graphical icon 107c representing the physical handicap navigation profile option, whereupon the route recommended may suggest a physical handicap pedestrian route, which, in one embodiment, avoids a set of stairs within the indoor area or one or more floors of the indoor area, for at least a route portion.

METHODOLOGY

Figure 3:
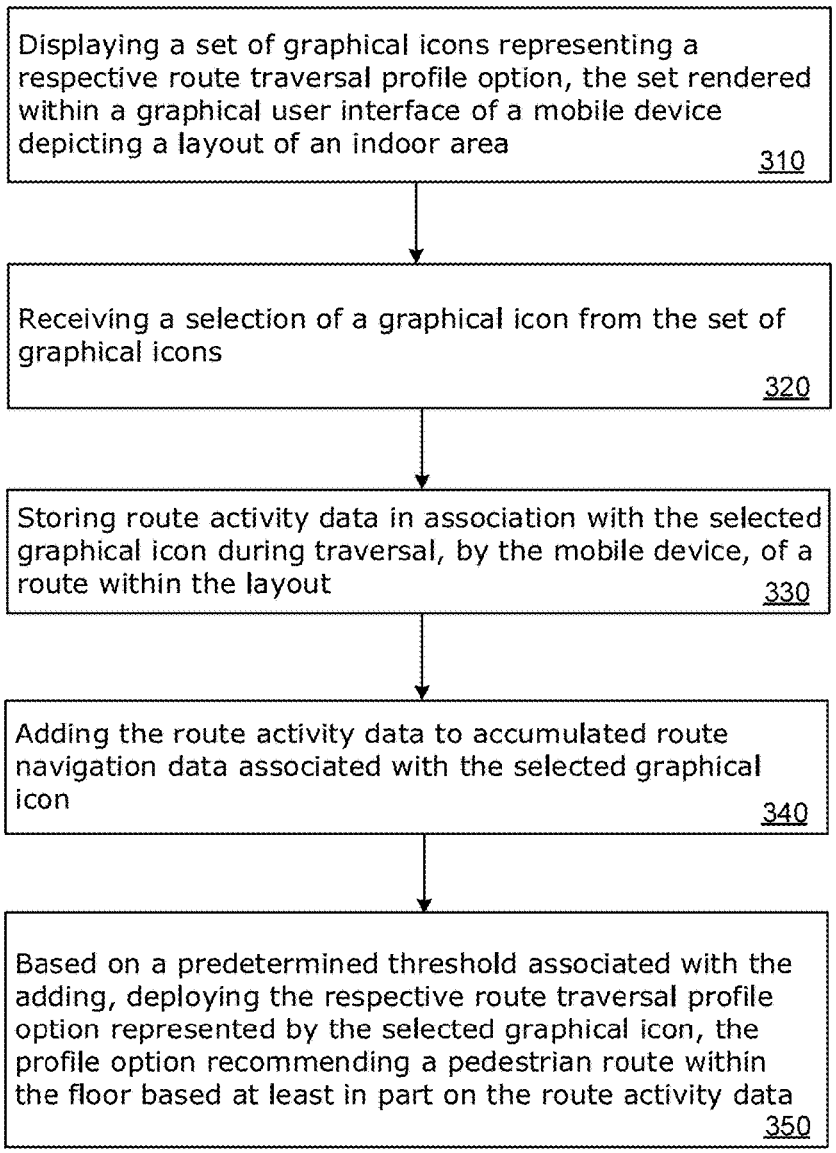
FIG. 3 illustrates, in an example embodiment, a method of operation of a crowd-sourced pedestrian navigation system.

FIG. 3 illustrates, in an example embodiment, a method of operation of crowd-sourced pedestrian navigation system 100 associated with an indoor area. In describing examples of FIG. 3, reference is made to the examples of FIGS. 1-2 for purposes of illustrating suitable components or elements for performing a step or sub-step being described.

Examples of method steps described herein are related to the use of server 101, which may host a database accessible to accumulative route navigation module 206 in one embodiment, for storing accumulated historical mobile device navigation information related to the indoor area. According to one embodiment, the techniques are performed the processor 201 executing one or more sequences of software logic instructions that constitute pedestrian route navigation logic module 106 of mobile device 102. In embodiments, pedestrian route navigation logic module 106 may include the one or more sequences of instructions within sub-modules including route activity module 205, accumulative route navigation module 206 and profile option deployment module 207. Such instructions may be read into memory 202 from machine-readable medium, such as memory storage devices.

Execution of the sequences of instructions contained in route activity module 205, accumulative route navigation module 206 and profile option deployment module 207 of pedestrian route navigation logic module 106 in memory 202 causes processor 201 to perform the process steps described herein. It is contemplated that, in some implementations, some of the sub-modules, or any other portions of executable instructions constituting pedestrian route navigation logic module 106, may be hosted at server 101 rather than mobile device 102. In alternative implementations, at least some hard-wired circuitry may be used in place of, or in combination with, the software logic instructions to implement examples described herein. Thus, the examples described herein are not limited to any particular combination of hardware circuitry and software instructions.

At step 310, displaying a set of graphical icons 107a-c representing respective pedestrian navigation profile options, for example, such as one of the "M", "F", and "C" choices depicted in the example of FIG. 1. The set of graphical icons 107a-c may be rendered within graphical user interface (GUI) 105 of mobile device 102, with GUI depicting indoor floor layout 104 of the indoor area. The indoor area may be such as within a shopping mall, an airport, a warehouse, a sports arena, a university or college campus building, or any at least partially enclosed building.

At step 320, receiving a selection of one of graphical icons 107a-c from the set of graphical icons presented at a GUI of mobile device 102.

At step 330, upon processor 201 executing the instructions of route activity module 205, storing route activity data in association with the selected graphical icon during traversal, by the mobile device, of a route within the layout.

In embodiments, the route activity data may include a dwell time at respective ones of a set of locations along a trajectory describing the traversal of the mobile device. For instance, positions or locations along the mobile device trajectory may correspond with a store location, a physical landmark, or another commercial enterprise. A relative longer dwell time recorded at any given location may indicate a strong interest of a mobile device carrier or user in whatever commercial enterprise, or physical landmark, may be located at that given position along the mobile device trajectory, and may even indicate that the mobile device user stopped to make a purchase there, for instance. On the other hand, a relative short, or average dwell time spent at a given position or location, may indicate that the mobile device user only has a passing interest, at best, in whatever enterprise might correlate with that respective location along the mobile device route traversed.

At step 340, upon processor 201 executing the instructions of profile accumulative route navigation module 206, adding the route activity data of mobile device 102 to accumulated route navigation data associated with the graphical icon representing a navigation profile option as selected by a user at mobile device 102. The accumulated route navigation data may comprise prior route activity data pertaining to respective mobile devices that have historically traversed the indoor area. In one embodiment, the accumulated route navigation data may be stored at a database communicatively accessible over communication network 108 to mobile device 102 and server computing device 101 (also referred to as server 101 herein).

In yet another embodiment, the route activity data pertaining to mobile device 102 may be temporarily quarantined, or only conditionally added, pending occurrence or performance of some confirming event, before being permanently added to the accumulated route navigation data. Such a confirming event may be such as a dwell time in a confirmed or landmarked location that could reasonably or confidently be associated with the profile option as selected by a user of mobile device 102. For instance, a significantly high or higher dwell time at a women's store, or at a women's washroom facility within the indoor area, would tend to confirm a "F" female profile option where such was selected by a user at the display interface of mobile device 102 prior to traversing the indoor area.

Similarly, a route traversed by mobile device 102 within the indoor area that eschews or avoids physical stairs where existing, in favor of a ramp or an elevator, would weigh in favor of, or tend to confirm, an inference of a physical handicap user route, where the user might have selected the "H" option as described in the examples 107a-c herein, prior to traversing the indoor area. As described in the examples herein, the "F", "M" and "H" may be graphical icons presented within graphical user interface 105 of mobile device 102, selectable to represent a female, male or physically handicapped user profile options respectively. It is contemplated that many other such options may be provided, such as for teenagers, children, athletes, or other designated groups based on user interests. It is contemplated that, in alternate embodiments, the graphical icons depicting selectable profile options within GUI 105 of mobile device 102 may not be limited to simply letters, for instance "F", "M" and "H" as depicted in FIG. 1, but rather could consist of more fanciful artwork or images, and even customizable artwork or images, while still maintaining the integrity of the particular navigation profile options made available for selection.

At step 350, upon processor 201 executing the instructions of profile option deployment module 207, based on a predetermined threshold associated with the adding, deploying the respective route traversal profile option represented by the selected graphical icon, the profile option recommending the pedestrian route based at least in part on the route activity data. A predetermined threshold may be applied, as route activity data of mobile devices are cumulatively added to the historical accumulated route navigation data, to determine when sufficient mobile devices' data, or sufficiently valid mobile devices' data, has been accumulated as prerequisite to launching or deploying the pedestrian route navigation profile options for use within the indoor area. In this manner, validates the accumulated route navigation data as sufficient for the deploying based on a most addition of mobile device 102 route activity data, in one embodiment.

In another embodiment, it is contemplated that a second command mode may be invoked using the same graphical icon selected, such as by double-tapping, or any series of repeated taps, upon the graphical icon selected, whereupon a recommendation for a route within the indoor area may be rendered via the GUI displayed at mobile device 102. In such embodiment, the route as displayed is recommended consistent with historical route activity data of mobile device users that has been accumulated for the given navigation profile option graphical icon selected via the double-tap that invokes such a second command mode. In one example, a path to traverse the indoor area is recommended and presented, highlighting specific locations of interest along that path. The locations of interest might be provided consistent with locations along the recommended route having significantly higher, or highest, dwell times at locations or positions according to the historical or cumulative route activity data related to historical traversals by mobile devices in which that given navigation profile option was selected within that indoor area. In one particular example, when the route traversal profile option, as deployed, is selected to invoke a recommendation for a physical handicap pedestrian route, such as via a double-tap or as series of taps performed within a predetermined time period upon the "H" graphical icon 107c in the example of FIG. 1, the pedestrian route recommended may display a route which avoids a set of stairs or a stairwell of the indoor area, for at least a route portion, in favor of an elevator or ramp.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method of recommending a pedestrian route based on crowd-sourced pedestrian navigation associated with an indoor area, the method comprising:
receiving an input, from a mobile device, selecting a graphical icon from a set of graphical icons representing a respective route traversal profile option;
obtaining route activity data in association with the selected graphical icon during traversal of the route, the route activity data indicative of information pertaining to user activity along a trajectory describing the traversal of the mobile device in the indoor area; and
deploying the respective route traversal profile option represented by the selected graphical icon, the profile option recommending the pedestrian route based at least in part on the route activity data.

2. The method of claim 1 further comprising displaying the set of graphical icons, the set being rendered within a graphical user interface (GUI) of a mobile device, the GUI depicting a layout of the indoor area.

3. The method of claim 1 wherein the method further comprises adding the route activity data to accumulated route navigation data associated with the selected graphical icon.

4. The method of claim 3 wherein the route activity data is conditionally added, before being permanently added to the accumulated route navigation data on occurrence a confirming event.

5. The method of claim 3 wherein the accumulated route navigation data comprises prior route traversal data pertaining to respective ones of a plurality of mobile devices within the indoor area, the accumulated route navigation data being stored at a server computing device communicatively accessible to the mobile device.

6. The method of claim 1 wherein the route activity data comprises a dwell time at respective ones of a set of locations along a trajectory describing the traversal of the mobile device.

7. The method of claim 6 wherein at least one of the set of locations is associated with at least one of a commercial enterprise and a physical landmark located within the indoor area.

8. The method of claim 6 wherein the dwell time data is correlated with time-stamped and position-correlated fingerprint data as the traversal progresses.

9. The method of claim 1 wherein the deploying is based on a predetermined threshold associated with the adding, the predetermined threshold validates the adding the route activity data to the accumulated route navigation data as sufficient for the deploying.

10. The method of claim 9 wherein the predetermined threshold is established using a total number of the plurality of mobile devices and the mobile device based on a statistically significant confidence level.

11. A server computing system for recommending a pedestrian route based on crowd-sourced pedestrian navigation associated with an indoor area, the server computing system comprising:
a processor; and
a memory storing a set of instructions, the instructions executable in the processor to:
receive an input, from a mobile device, selecting a graphical icon from a set of graphical icons representing a respective route traversal profile option;
obtain route activity data in association with the selected graphical icon during traversal of the route, the route activity data indicative of information pertaining to user activity along a trajectory describing the traversal of the mobile device in the indoor area; and
deploy the respective route traversal profile option represented by the selected graphical icon, the profile option recommending the pedestrian route based at least in part on the route activity data.

12. The server computing system of claim 11 wherein the instructions executable in the processor further comprises displaying the set of graphical icons, the set being rendered within a graphical user interface (GUI) of a mobile device, the GUI depicting a layout of the indoor area.

13. The server computing system of claim 11 wherein the instructions executable in the processor further comprises adding the route activity data to accumulated route navigation data associated with the selected graphical icon.

14. The server computing system of claim 13 wherein the route activity data is conditionally added, before being permanently added to the accumulated route navigation data on occurrence a confirming event.

15. The server computing system of claim 11 wherein the accumulated route navigation data comprises prior route traversal data pertaining to respective ones of a plurality of mobile devices within the indoor area.

16. The server computing system of claim 11 wherein the route activity data comprises a dwell time at respective ones of a set of locations along a trajectory describing the traversal of the mobile device.

17. The server computing system of claim 16 wherein at least one of the set of locations is associated with at least one of a commercial enterprise and a physical landmark located within the indoor area.

18. The server computing system of claim 16 wherein the dwell time data is correlated with time-stamped and position-correlated fingerprint data as the traversal progresses.

19. The server computing system of claim 11 wherein the deploying is based on a predetermined threshold associated with the adding, the predetermined threshold validates the adding the route activity data to the accumulated route navigation data as sufficient for the deploying.

20. The server computing system of claim 19 wherein the predetermined threshold is established using a total number of the plurality of mobile devices and the mobile device based on a statistically significant confidence level.

* * * * *